US008244185B2

(12) United States Patent
Zhou et al.

(10) Patent No.: US 8,244,185 B2
(45) Date of Patent: Aug. 14, 2012

(54) SYSTEM AND METHOD FOR UNSYNCHRONIZED COOPERATIVE SPECTRUM SENSING IN COGNITIVE RADIO NODES

(75) Inventors: Xiangwei Zhou, Atlanta, GA (US); Young Hoon Kwon, San Diego, CA (US); Anthony C. K. Soong, Plano, TX (US)

(73) Assignee: Futurewei Technologies, Inc., Plano, TX (US)

( * ) Notice: Subject to any disclaimer, the term of this patent is extended or adjusted under 35 U.S.C. 154(b) by 718 days.

(21) Appl. No.: 12/205,716

(22) Filed: Sep. 5, 2008

(65) Prior Publication Data
US 2010/0062718 A1   Mar. 11, 2010

(51) Int. Cl.
*H04B 17/00* (2006.01)
(52) U.S. Cl. ............ 455/67.11; 455/509; 375/267; 375/329; 370/341; 370/445
(58) Field of Classification Search .......... 455/67.11, 455/509; 375/267, 329; 370/341, 445
See application file for complete search history.

(56) References Cited

U.S. PATENT DOCUMENTS

| 7,386,030 | B2 * | 6/2008 | Asghar et al. ............ 375/142 |
| 7,424,071 | B2 * | 9/2008 | Allpress et al. ........... 375/343 |
| 7,885,229 | B2 * | 2/2011 | Huttunen et al. .......... 370/329 |
| 2008/0165883 | A1 | 7/2008 | Jiang et al. | |

FOREIGN PATENT DOCUMENTS
CN    101521896 A    9/2009

OTHER PUBLICATIONS

Chen, L., et al., "Cooperative Spectrum Sensing with Multi-bits Local Sensing Decisions in Cognitive Radio Context," IEEE Wireless Communications and Networking Conference (WCNC 2008), Mar. 31, 2008-Apr. 3, 2008, pp. 570-575, IEEE, Los Alamitos, CA.
Ghasemi, A., et al., "Collaborative Spectrum Sensing for Opportunistic Access in Fading Environments," First IEEE International Symposium on New Frontiers in Dynamic Spectrum Access Networks (DySPAN 2005), Nov. 8-11, 2005, pp. 131-136, IEEE, Los Alamitos, CA.
Ghasemi, A., et al., "Impact of User Collaboration on the Performance of Sensing-Based Opportunistic Spectrum Access," IEEE 64th Vehicular Technology Conference (VTC-2006), Sep. 2006, pp. 1-6, IEEE, Los Alamitos, CA.
Kim, H., et al., "Efficient Discovery of Spectrum Opportunities with MAC-Layer Sensing in Cognitive Radio Networks," IEEE Transactions on Mobile Computing, May 2008, pp. 533-545, vol. 7, Issue 5, IEEE, Los Alamitos, CA.
Kam, M., et al., "Optimal Data Fusion of Correlated Local Decisions in Multiple Sensor Detection Systems," IEEE Transactions on Aerospace and Electronic Systems, Jul. 1992, pp. 916-920, vol. 28, Issue 3, IEEE, Los Alamitos, CA.

(Continued)

*Primary Examiner* — Tuan H Nguyen
(74) *Attorney, Agent, or Firm* — Slater & Matsil, L.L.P.

(57) ABSTRACT

System and method for unsynchronized cooperative spectrum sensing in cognitive radio nodes. A method comprises receiving spectrum sensing information from a plurality of communications nodes, computing for each communications node in the plurality of communications nodes, a likelihood ratio based on spectrum sensing information provided by the communications node, combining the likelihood ratios, and computing a decision value based on the combined likelihood ratio. Each communications node determines its respective spectrum sensing information at a time unrelated to times when other communications nodes determine their spectrum sensing information.

21 Claims, 4 Drawing Sheets

OTHER PUBLICATIONS

Ma, J., et al., "Soft Combination and Detection for Cooperative Spectrum Sensing in Cognitive Radio Networks," IEEE Global Telecommunications Conference (GLOBECOM '07), Nov. 26-30, 2007, IEEE, Los Alamitos, CA.

Zhao, Q., et al., "Optimal Dynamic Spectrum Access via Periodic Channel Sensing," IEEE Wireless Communications and Networking Conference (WCNC 2007), Mar. 11-15, 2007, pp. 33-37, IEEE, Los Alamitos, CA.

Chair, Z. et al., "Optimal data fusion in multiple sensor detection systems", IEEE Trans. on Aerospace and Electron. Syst., vol. AES-22, No. 1, Jan. 1986, pp. 98-101.

Blum, Rick S., et al., "Distributed Detection with Multiple Sensors: Part II—Advanced Topics," Proceedings of the IEEE, vol. 85, No. 1, Jan. 1997, pp. 64-79.

Viswanathan, Ramanarayanan et al., "Distributed Detection with Multiple Sensors: Part I—Fundamentals," Proceedings of the IEEE, vol. 85, No. 1, Jan. 1997, pp. 54-63.

Written Opinion of the International Searching Authority and Search Report, PCT/CN2009/073652, Huawei Technologies Co., Ltd., et al., mailed Nov. 26, 2009; 10 pages.

* cited by examiner

SYSTEM AND METHOD FOR UNSYNCHRONIZED COOPERATIVE SPECTRUM SENSING IN COGNITIVE RADIO NODES

TECHNICAL FIELD

The present invention relates generally to a system and method for wireless communications, and more particularly to a system and method for unsynchronized cooperative spectrum sensing in cognitive radio nodes.

BACKGROUND

In general, cognitive radio (CR) is a form of wireless communications wherein either a wireless CR network or a CR node changes its transmission and/or reception parameters in order to communicate efficiently and avoid interference from or interfering with licensed and/or unlicensed users. Therefore, an important feature in CR is the ability to detect the presence of licensed and/or unlicensed transmissions. This is commonly referred to as spectrum sensing.

Spectrum sensing usually involves energy detection within a frequency band of interest and may be achieved using a band-pass filter with a pass-band spanning the frequency band of interest, a received energy measuring device, an accumulator to accumulate the received energy over a desired observation interval, and a decision device to compare the accumulated received energy with a threshold. If the accumulated received energy is greater than the threshold, then transmissions may be deemed to be present in the frequency band of interest. Spectrum sensing may be performed at CR nodes and information arising from the spectrum sensing may be used by the CR nodes to alter their transmission and/or reception parameters.

Recent proposals have been made to perform cooperative spectrum sensing, wherein multiple CR nodes may perform spectrum sensing and then the multiple CR nodes may share the results of the spectrum sensing to help improve overall spectrum sensing performance. The results of the spectrum sensing may be provided to a combining node that may aggregate the cooperating spectrum sensing results and provide the combined cooperative spectrum sensing information to the multiple CR nodes.

Cooperative spectrum sensing may be able to help improve the performance of certain CR nodes that may be prevented from properly detecting the spectrum due to their location. For example, a CR node may be positioned behind a large object or body, such as a large building, a mountain, a large stand of trees, and so forth, which may prevent the CR node from detecting a licensed user located on a far side of the large object. In such a situation, combined cooperative spectrum sensing information from other CR nodes may help the CR node properly adjust its transmission and/or reception parameters.

However, the cooperative spectrum sensing proposals heretofore have been synchronized in nature, wherein the CR nodes all perform the cooperative spectrum sensing at substantially the same time and provide the results of the cooperative spectrum sensing to the combining node. The combining node may then aggregate the cooperative spectrum sensing results based on an assumption that the individual results are based on synchronized observations.

FIG. 1 illustrates spectrum sensing activity of a number of CR nodes performing cooperative spectrum sensing in a synchronized fashion. A first trace 105 displays spectrum sensing activity by a first CR node, a second trace 110 displays spectrum sensing activity by a second CR node, and a third trace 115 displays spectrum sensing activity by a K-th CR node. Operating in synchrony, the first through K-th CR nodes begin and stop spectrum sensing at substantially the same time, shown as shaded boxes 106, 111, and 116. Then, at a time $T_S$, the first through K-th CR nodes may transmit results of their respective spectrum sensing to a combining node over a common control channel, for example. The combining node may at time T receive the results of the spectrum sensing from the first through K-th CR nodes and compute a combined cooperative spectrum sensing information. The combined cooperative spectrum sensing information computed by the combining node may then be provided back to the first through K-th CR nodes.

SUMMARY OF THE INVENTION

These and other problems are generally solved or circumvented, and technical advantages are generally achieved, by embodiments of a system and a method for unsynchronized cooperative spectrum sensing in cognitive radio nodes.

In accordance with an embodiment, a method for performing cooperative spectrum sensing for a frequency band is provided. The method includes receiving spectrum sensing information from a plurality of communications nodes, computing for each communications node in the plurality of communications nodes, a likelihood ratio based on spectrum sensing information provided by the communications node, combining the likelihood ratios, and computing a decision value based on the combined likelihood ratio. Each communications node determines its respective spectrum sensing information at a time unrelated to times when other communications nodes in the plurality of communications nodes determine their spectrum sensing information.

In accordance with another embodiment, a method for performing unsynchronized cooperative spectrum sensing for a frequency band is provided. The method includes receiving a decision about a state of the frequency band from each node in a plurality of nodes, computing for each received decision, a likelihood ratio based on the received decision, computing a combined likelihood ratio from the computed likelihood ratios, determining a combined decision from the combined likelihood ratio, and providing the combined decision to the plurality of nodes. Each decision is determined at a time unrelated to times when other nodes in the plurality of nodes determine their corresponding decisions.

In accordance with another embodiment, an electronic device is provided. The electronic device includes a receiver that processes signals transmitted over the air, a transmitter that processes signals to be transmitted over the air, a processor coupled to the receiver and to the transmitter, and a memory coupled to the processor. The processor computes a likelihood ratio for each decision about a state of a frequency band received by the electronic device, computes a combined likelihood ratio from the likelihood ratios, and makes a decision about a state of the frequency band based on the combined likelihood ratio. Each decision is provided by a communications node out of a plurality of communications nodes and each decision is made at a time independent of times when other communications nodes make their decisions. The memory stores the received decisions, the computed likelihood ratios, and the combined likelihood ratio.

An advantage of an embodiment is that the spectrum sensing performed by the CR nodes does not need to be synchronized, which may help to reduce the complexity of the cooperative spectrum sensing process.

A further advantage of an embodiment is that a weighting is applied to the spectrum sensing information, allowing a greater weight to be applied to more recent spectrum sensing information and a lesser weight to be applied to older spectrum sensing information. This may help improve the quality of the combined cooperative spectrum sensing information since older information may be less accurate than recent information.

The foregoing has outlined rather broadly the features and technical advantages of the present invention in order that the detailed description of the embodiments that follow may be better understood. Additional features and advantages of the embodiments will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the embodiments, and the advantages thereof, reference is now made to the following descriptions taken in conjunction with the accompanying drawings, in which.

DETAILED DESCRIPTION OF ILLUSTRATIVE EMBODIMENTS

The making and using of the embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The embodiments will be described in a specific context, namely a cognitive radio (CR) communications network with the capability of performing unsynchronized cooperative spectrum sensing with CR nodes operating in the CR communications network. The invention may also be applied, however, to other communications networks and devices, wherein there is a desire to detect transmissions from other devices operating in nearby.

Figure 2A:
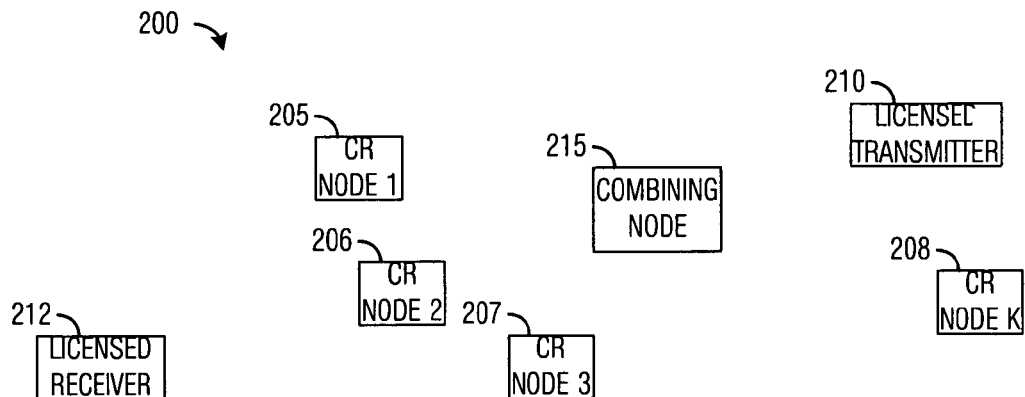
FIG. 2a is a diagram of a CR communications network.

With reference now to FIG. 2a, there is shown a diagram illustrating a CR communications network 200. The CR communications network 200 includes at least one CR node, such as CR node 1 205, CR node 2 206, CR node 3 207, and CR node K 208. Generally, in a CR communications network, such as the CR communications network 200, CR nodes may modify their transmission and/or reception parameters, such as transmission/reception power, times, durations, encoding, modulation, data rate, and so forth, based on the presence of transmitters operating in the general vicinity of the CR communications network. This may be especially true if some of the transmitters are licensed transmitters. A licensed transmitter may be a transmitter specifically authorized by a regulatory body, such as the Federal Communications Commission (FCC), to transmit within a specified frequency band. Generally, transmissions made by a licensed transmitter are protected by law from transmissions from other transmitters. The CR communications network 200 may be operating near a licensed transmitter 210 and a licensed receiver 212.

In order to modify their transmission and reception parameters, the CR nodes may need to be able to detect the presence of transmissions, especially transmissions from licensed transmitters. A CR node may attempt to detect the presence of transmissions by performing a spectrum detection operation. As discussed previously, a spectrum detection may be performed by accumulating a received signal power within a frequency band of interested over a detection interval and if the accumulated received signal power over the detection interval exceeds a threshold, then the CR code may determine that a transmission is taking place.

However, due to signal fading, signal blocking, signal attenuation, and so forth, a CR node may, in some circumstances, not be able to detect a transmission. For example, a large body may be positioned in between the CR node and a source of the transmission. The large body may block or sufficiently attenuate the transmission to a point wherein the accumulated received signal power over the detection power is less than the threshold. Therefore, cooperative spectrum detection, wherein several CR nodes may share information regarding their respective spectrum detection operations, may help improve a probability of detecting a transmission.

In general, there may be two forms of cooperative spectrum sensing. A first form may be synchronized cooperative spectrum sensing, as discussed previously. A second form may be unsynchronized cooperative spectrum sensing. Unlike synchronized cooperative spectrum sensing, where the CR nodes involved in the synchronized cooperative spectrum sensing perform the spectrum sensing at substantially the same time, in unsynchronized cooperative spectrum sensing, the CR nodes may be allowed to perform spectrum sensing without having to coordinate with other CR nodes. At a CR node involved in unsynchronized cooperative spectrum sensing, the time that the CR node performs its spectrum sensing may be unrelated (or otherwise independent) to times when other CR nodes perform their spectrum sensing.

Figure 1:
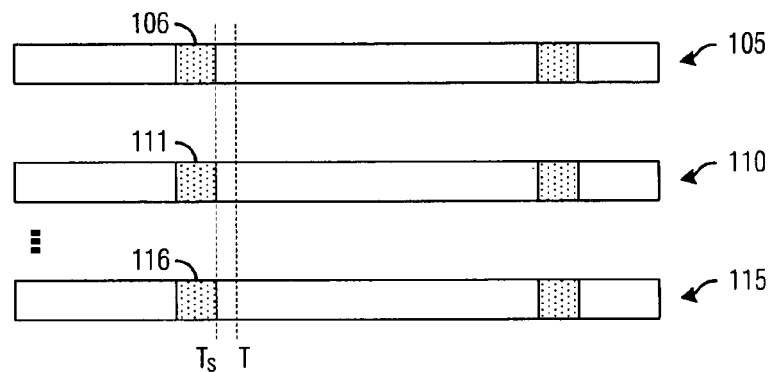
FIG. 1 is a diagram of spectrum sensing activity of a number of CR nodes.
Figure 3A:
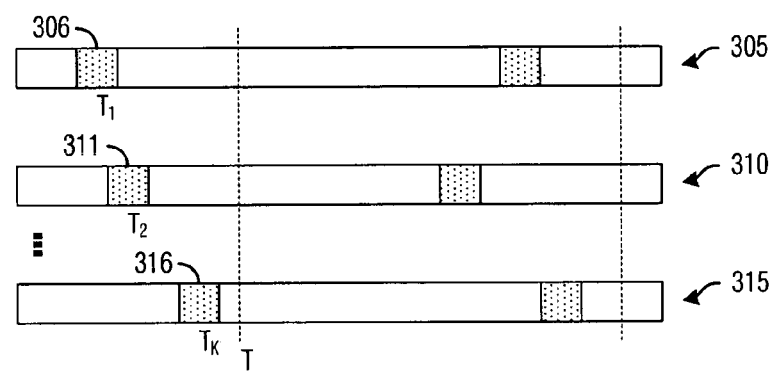
FIG. 3a is a diagram of spectrum sensing activity of a number of CR nodes performing unsynchronized cooperative spectrum sensing.

FIG. 3a is a diagram illustrating spectrum sensing activity of a number of CR nodes performing unsynchronized cooperative spectrum sensing. A first trace 305 displays spectrum sensing activity by a first CR node, a second trace 310 displays spectrum sensing activity by a second CR node, and a third trace 315 displays spectrum sensing activity by a K-th CR node. Operating in an unsynchronized manner, the first CR node may perform its spectrum sensing activity at a time ending at time $T_1$ (shown as block 306), the second CR node may perform its spectrum sensing activity at a time ending at time $T_2$ (shown as block 311), and the K-th CR node may perform its spectrum sensing activity at a time ending at time $T_K$ (shown as block 316). The times $T_1$, $T_2$, and $T_K$ may be unequal as well as being unrelated (or independent). As each CR node completes its spectrum sensing activity, they may transmit information related to their spectrum sensing activity to a combining node, such as the combining node 215 (shown in FIG. 2a).

Then, at time T, the combining node 215 may combine the information provided by the CR nodes to determine if a transmission has taken place. The combining node 215 may initiate the combining of the information once it has received information from each CR node, or when it has received information from a pre-specified number or percentage of CR nodes. For example, the combining node 215 may initiate the combining once it has received information from 75% of CR nodes, for example. The percentage, 75%, may be provided as an example. An actual percentage CR nodes or actual number of CR nodes may be based on factors such as, a total number of CR nodes, desired interval between unsynchronized cooperative spectrum sensing operations, a desired wait time, desired accuracy, and so forth. Therefore, the discussion of 75% should not be construed as being limiting to either the scope or the spirit of the embodiments.

Turning back to FIG. 2a, the individual CR nodes may transmit information regarding their spectrum detection operations to a combining node 215. The information from the individual CR nodes may then be used by the combining node 215 to determine the presence of the transmission. For example if the combining node 215 receives information from four CR nodes and three of the CR nodes report that they have detected a transmission. Then, the combining node 215 may determine that a transmission has indeed been detected since a majority (three out of four) CR nodes report the detection of the transmission. More elaborate methods and algorithms may be used to combine the information provided by the CR nodes.

Figure 3B:
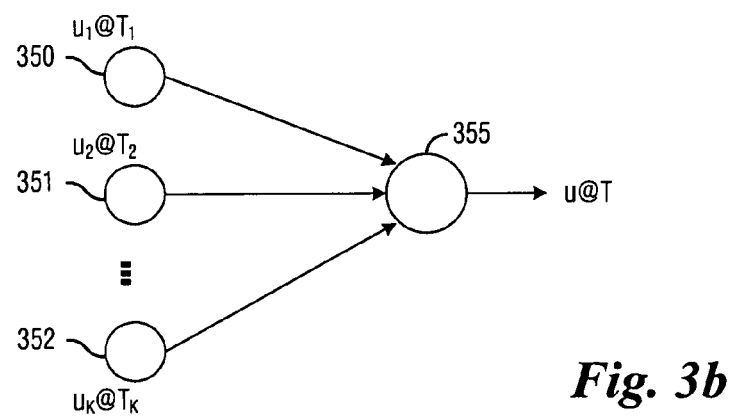
FIG. 3b is a diagram of a combining of information from CR nodes by a combining node.

FIG. 3b is a diagram illustrating a combining of information from CR nodes by a combining node. A first CR node (shown as node 350) may transmit information ($u_1$) at time $T_1$ to a combining node (shown as node 355). Similarly, a second CR node (shown as node 351) may transmit information ($u_2$) at time $T_2$ to the combining node 355 and a K-th CR node (shown as node 352) may transmit information ($u_K$) at time $T_K$ to the combining node 355. Then, at time T, the combining node 355 may then combine the information ($u_1$, $u_2$, ..., $u_K$) to produce a result (u), the combined cooperative spectrum sensing information.

Turning back to FIG. 2a, after combining the cooperative spectrum sensing information provided by the CR nodes, the combining node 215 may transmit the result (u) back to the CR nodes so that the CR nodes may take appropriate action based on the result (u). The combining node 215 may transmit the result (u) back to only the CR nodes that provided the cooperative spectrum sensing information that the combining node 215 used in combining the result (u) or the combining node 215 may provide the result (u) back to all of the CR nodes in the CR communications network 200.

Figure 2B:
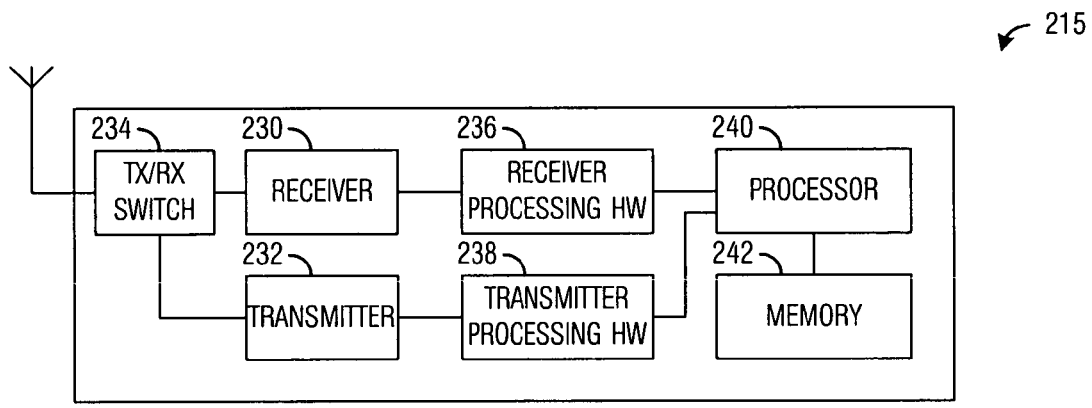
FIG. 2b is a diagram of a combining node.

FIG. 2b is a diagram illustrating a detailed view of a combining node 215. The combining node 215 includes a receiver 230 and a transmitter 232 for use in receiving signals and transmitting signals. Depending on configuration, a transmit/receive (TX/RX) switch 234 may allow for the receiver 230 and the transmitter 232 to share an antenna. Alternatively, the receiver 230 and the transmitter 232 may have dedicated receive and transmit antennas.

The combining node 215 also includes receiver processing hardware 236 that may be used for processing received signals, including filtering, decoding, error detecting and correcting, amplifying, digitizing, mixing, and so forth. The combining node 215 also includes transmitter processing hardware 238 that may be used for processing signals to be transmitted, including filtering, encoding, mixing, amplifying, and so on. Output of the receiver processing hardware 236, such as data, may be provided to a processor 240. The processor 240 may be used to perform computations using the output of the receiver processing hardware 236. A memory 242 may be used to store data, applications, programs, configuration information, and so forth.

Figure 2C:
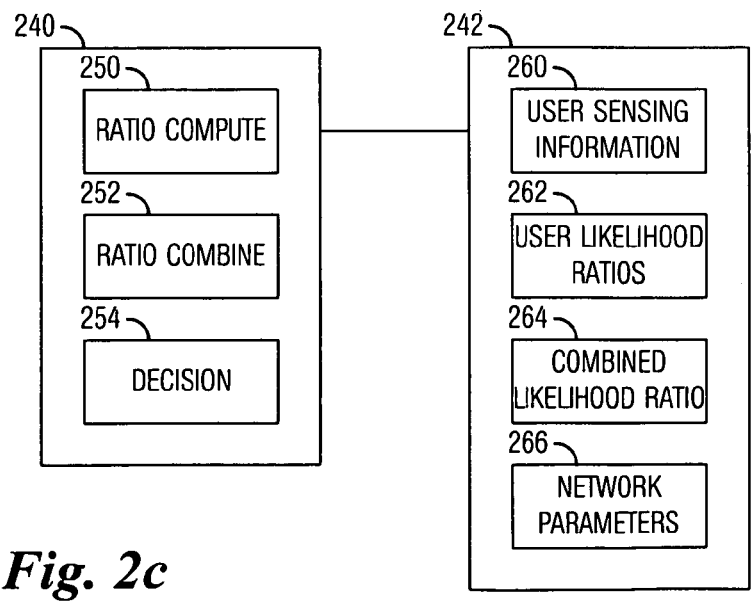
FIG. 2c is a diagram of a portion of a combining node.

FIG. 2c is a diagram illustrating a detailed view of a processor 240 and a memory 242. The processor 240 includes a ratio compute unit 250. The ratio compute unit 250 may be used to compute a likelihood ratio for each CR node that transmits to the combining node 215 information related to its spectrum sensing. The likelihood ratio may be described as a ratio of a probability a CR node determines that a transmission is present (or absent) given that a licensed transmitter (or some other transmitter) is actually transmitting to a probability that the CR node determines that the transmission is absent (or present) given that the licensed transmitter (or some other transmitter) is not transmitting. A detailed discussion of the computing of the likelihood ratio is provided below.

The processor 240 also includes a ratio combine unit 252. The ratio combine unit 252 may be used by the processor 240 to combine the likelihood ratios for each of the CR nodes into a combined likelihood ratio. The processor 240 further includes a decision unit 254. The decision unit 254 may make use of the combined likelihood ratio to determine if the transmission actually exists. The decision unit 254 may make use of the information from each CR node's spectrum sensing in its determination of the presence or absence of the transmission.

The processor 240 may utilize the memory 242 for storage of spectrum sensing information as well as storage of likelihood ratios and so forth. The memory 242 may be used to store the information related to each CR's spectrum sensing (user sensing information block 260). A user likelihood ratios block 262 may be used to store the likelihood ratios computed by the ratio compute unit 250 of the processor 240, while a combined likelihood ratio block 264 may be used to store the combined likelihood ratio computed by the ratio combine unit 252. The computing of the likelihood ratios for the CR nodes and the combined likelihood ratio may require the knowledge of various parameters of the CR communications network, including historic information related to the performance, traffic distribution, traffic transition rates, licensed transmitter activity, and so forth. This information may be stored in a network parameters block 266.

Figures 4A, 4B:
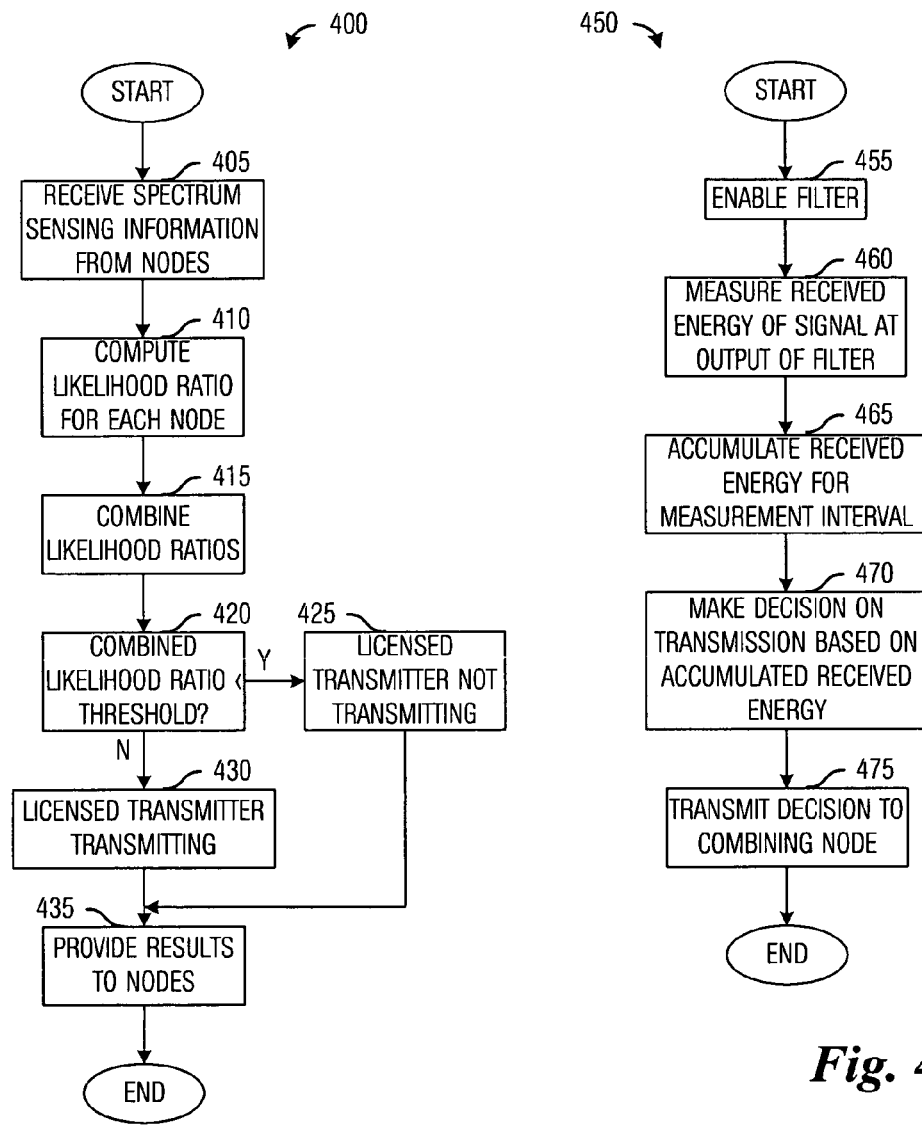
FIG. 4a is a flow diagram of a sequence of events for the combining of unsynchronized cooperative spectrum sensing information.
FIG. 4b is a flow diagram of a sequence of events for the generating of unsynchronized cooperative spectrum sensing information.

FIG. 4a is a diagram illustrating a sequence of events 400 for the combining of unsynchronized cooperative spectrum sensing information. The combining of unsynchronized cooperative spectrum sensing information may take place in a combining node, such as the combining node 215, and may make use of information provided by CR nodes, such as CR nodes 205-208. The combining of unsynchronized cooperative spectrum sensing information may take place periodically at predetermined intervals or whenever a sufficient number of CR nodes have provided their unsynchronized cooperative spectrum sensing information to the combining node 215. For example, the CR nodes may be configured to perform spectrum sensing at least once every X seconds and provide the information to the combining node 215. The combining node 215 may then combine the unsynchronized cooperative spectrum sensing information once it has received the information from all CR nodes or a specified number or percentage of CR nodes. Alternatively, the combining node 215 may be configured to combine the unsynchronized cooperative spectrum sensing information periodically, regardless of the amount of information that it has received from the CR nodes.

The combining of unsynchronized cooperative spectrum sensing information may begin with the combining node receiving the information from the CR nodes (block 405). As discussed above, the combining node 215 may commence combining the unsynchronized cooperative spectrum sensing information periodically or after it has received information from a sufficient number or percentage of CR nodes.

The combining of the unsynchronized cooperative spectrum sensing information may involve a computing of a likelihood ratio $Y_i$ for CR node i, for i=1 ... K. According to the optimal data fusion mode, a combined likelihood ratio Y may be expressed mathematically as:

$$Y = \frac{P(u_1, u_2, \ldots, u_K \mid H_1)}{P(u_1, u_2, \ldots, u_K \mid H_0)}, \quad (1)$$

where P( ) is a probability, $H_1$ is a hypothesis that the transmission is present, $H_0$ is a hypothesis that the transmission is absent, and $u_i$ is spectrum sensing information from CR node i. From the combined likelihood ratio Y a combined decision u may determined. The combined decision u may be expressed mathematically as:

$$u \begin{cases} H_1 & \text{if } Y \geq \frac{P_0}{P_1} \\ H_0 & \text{if } Y < \frac{P_0}{P_1}, \end{cases} \quad (2)$$

where $P_1$ and $P_0$ are prior probabilities of the presence and absence of transmissions and may be computed from observations of historical spectrum usage data, for example.

For discussion purposes, assume that at each CR node, a hard decision is made regarding the presence or absence of the transmission. Therefore, $u_i$ may either be 1 indicating that the transmission is present or 0 indicating that the transmission is absent, for example. Since the spectrum sensing performed at CR node i occurs unsynchronized and is independent of the spectrum sensing occurring at other CR nodes, each of the probabilities from the combined likelihood ratio Y may be expressed as:

$$P(u_1, u_2, \ldots, u_K \mid H_j) = \prod_{i=1}^{K} P(u_i \mid H_j), \quad (3)$$

where j may be either 0 or 1. It may then be shown that:

$$P(u_i=1 \mid H_1) = P(u_i=1 \mid B_i)P(B_i \mid H_1) + P(u_i=1 \mid I_i)P(I_i \mid H_1), \quad (4)$$

where $B_i$ and $I_i$ denote the presence or absence of a transmission at time $t_i$. From equation (4), $$P(u_i=1 \mid B_i) = P_{D,i} \quad (5)$$

and $$P(u_i=1 \mid I_i) = P_{F,i}, \quad (6)$$

where $P_{D,i}$ and $P_{F,i}$ are detection probability and false alarm probability for CR node i.

A frequency band wherein the transmissions are taking place may be modeled as an alternating renewable source that alternates between busy (B) and idle (I) periods, wherein being busy denotes that a transmission is occupying a frequency band and being idle denotes that a transmission is not occupying the frequency band. The busy and idle periods may be assumed to be exponentially distributed with probability density functions expressible as:

$$f_B(t) = \alpha e^{-\alpha t} \quad (7)$$

and $$f_I(t) = \beta e^{-\beta t}, \quad (8)$$

where $\alpha$ may be a transition rate from busy to idle state and $\beta$ may be a transition rate from idle to busy state. It may be shown that $$\frac{P_0}{P_1} = \frac{\alpha}{\beta}.$$

With the help of its age distribution, it may also be shown that:

$$P(B_i \mid H_1) = \int_{t-t_i}^{\infty} \alpha e^{-\alpha t} dt = e^{-\alpha(t-t_i)} \quad (9)$$

and $$P(I_i \mid H_1) = 1 - P(B_i \mid H_1) = 1 - e^{-\alpha(t-t_i)}. \quad (10)$$

Then, substituting equations (5), (6), (9), and (10) into equation (4), it may be shown that:

$$P(u_i=1 \mid H_1) = P_{D,i} e^{-\alpha(t-t_i)} + P_{F,i}(1 - e^{-\alpha(t-t_i)}). \quad (11)$$

Similarly, it may be shown that:

$$P(u_i=1 \mid H_0) = P_{D,i}(1 - e^{\beta(t-t_i)}) + P_{F,i} e^{\beta(t-t_i)}, \quad (12)$$

$$P(u_i=0 \mid H_1) = (1 - P_{D,i})e^{-\alpha(t-t_i)} + (1 - P_{F,i})(1 - e^{-\alpha(t-t_i)}), \quad (13)$$

and $$P(u_i=0 \mid H_0) = (1 - P_{D,i})(1 - e^{\beta(t-t_i)}) + (1 - P_{F,i})e^{\beta(t-t_i)}. \quad (14)$$

Using the result of equation (3) and equations (11)-(14), it may be possible to compute a likelihood ratio $Y_i$ for CR node i, for i=1 ... K, from the received information from the CR nodes (block 410). For example, if $u_i=1$, then the likelihood ratio $Y_i$ may be computed as:

$$Y_i = \frac{P(u_i = 1 \mid H_1)}{P(u_i = 1 \mid H_0)} = \frac{(11)}{(12)} = \frac{P_{D,i} e^{-\alpha(t-t_i)} + P_{F,i}(1 - e^{-\alpha(t-t_i)})}{P_{D,i}(1 - e^{-\beta(t-t_i)}) + P_{F,i} e^{-\beta(t-t_i)}}.$$

Similarly, if $u_i=0$, then the likelihood ratio $Y_i$ may be computed as:

$$Y_i = \frac{P(u_i = 0 \mid H_1)}{P(u_i = 0 \mid H_0)} = \frac{(13)}{(14)} = \frac{(1 - P_{D,i})e^{-\alpha(t-t_i)} + (1 - P_{F,i})(1 - e^{-\alpha(t-t_i)})}{(1 - P_{D,i})(1 - e^{-\beta(t-t_i)}) + (1 - P_{F,i})e^{-\beta(t-t_i)}}.$$

Figure 5:
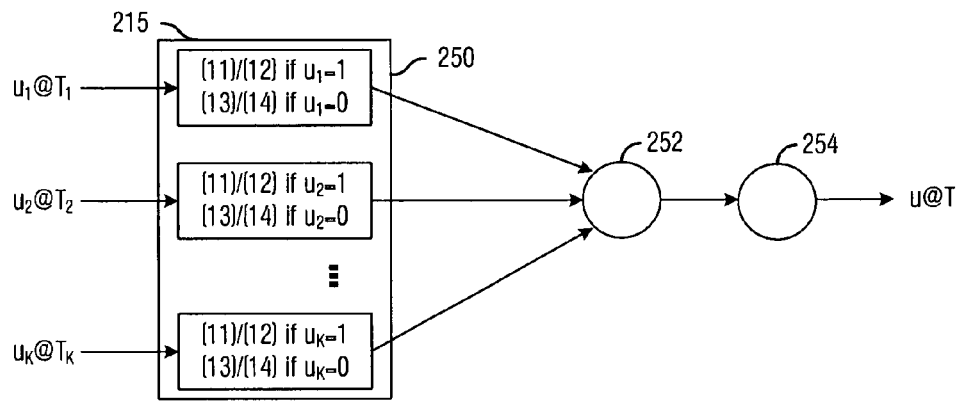
FIG. 5 is a diagram of a combining of information from CR nodes by a combining node.

FIG. 5 is a diagram illustrating a combining of information from CR nodes by a combining node. As a first CR node transmits information ($u_1$) at time $T_1$ to a combining node (shown as combining node 215), a ratio compute unit, such as the ratio compute unit 250, may compute the likelihood ratio $Y_i$ with i=1. Similarly, as a second CR node transmits information ($u_2$) at time $T_2$ to the combining node 215, the ratio compute unit 250 may compute the likelihood ratio $Y_i$ with i=1 and as a K-th CR node transmits information ($u_K$) at time $T_K$ to the combining node 215, the ratio compute unit 250 may compute the likelihood ratio $Y_i$ with i=K. Then a ratio combine unit, such as the ratio combine unit 252, may combine the likelihood ratios for the CR nodes into a combined likelihood ratio Y, from which a combined decision u may be determined, using a decision unit, such as the decision unit 254, for example.

Turning back now to FIG. 4a, after computing the likelihood ratio $Y_i$ for CR node i, for i=1 . . . K, from the received information from the CR nodes, a combined likelihood ratio Y may be computed by multiplying together the likelihood ratio $Y_i$ for CR node i, for i=1 . . . K, from the received information from the CR nodes (block 415). The combined likelihood ratio Y may be expressed as:

$$Y = \prod_{i=1}^{K} Y_i.$$

With the combined likelihood ratio Y computed, the combined decision u may be determined by comparing the combined likelihood ratio Y against a threshold (block 420). As discussed previously, the threshold may be expressed as:

$$\frac{P_0}{P_1}.$$

If the combined likelihood ration Y is less than the threshold, then the transmission is determined as not be present (block 425), while if combined likelihood ratio Y is greater than or equal to the threshold, then the transmission is determined to be present (block 430). The combined decision u may then be provided to the CR nodes (block 435) and the combining of the unsynchronized cooperative spectrum sensing information may terminate.

The above discussion of the combining of unsynchronized cooperative spectrum sensing assumed that a hard decision (either the transmission is present or absent, i.e., a single bit of information) was made by the CR nodes providing the unsynchronized cooperative spectrum sensing information to the combining node 215. However, the unsynchronized cooperative spectrum sensing may be extended so that the CR nodes may make soft decisions regarding the presence or absence of the transmission. A soft decision may involve several bits of information and may convey a degree of uncertainty in the decision. For example, a soft decision may convey two-bits of information representing four different possible values regarding the transmission: a definite present (11), a may be present (10), a may be absent (01), and a definite absent (00). Although the example shows that the soft decision uses two-bits to represent possible values regarding the transmission, in general, it may be possible to use other numbers of bits. Possible numbers of bits may be two, three, four, five, and so forth.

The CR nodes may then transmit the multi-bit soft decision to the combining node 215. Since the soft decision may have increased the number of possible decision states provided by the CR nodes to the combining node 215, the combining node 215 may need to adjust how it computes the likelihood ratio $Y_i$ for CR node i, for i=1 . . . K, from the received information from the CR nodes. The combining node 215 may need to take into account the different possible soft decision values that the CR nodes may transmit to it when it computes the likelihood ratio $Y_i$. For example if a two-bit soft decision is used by the CR nodes, then the combining node 215 may compute the likelihood ratio $Y_i$ as follows:

If $u_i$=00, then the likelihood ratio $Y_i$ may be computed as:

$$Y_i = \frac{P(u_i = 00 \mid H_1)}{P(u_i = 00 \mid H_0)},$$

If $u_i$=01, then the likelihood ratio $Y_i$ may be computed as:

$$Y_i = \frac{P(u_i = 01 \mid H_1)}{P(u_i = 01 \mid H_0)},$$

If $u_i$=10, then the likelihood ratio $Y_i$ may be computed as:

$$Y_i = \frac{P(u_i = 10 \mid H_1)}{P(u_i = 10 \mid H_0)},$$

If $u_i$=11, then the likelihood ratio $Y_i$ may be computed as:

$$Y_i = \frac{P(u_i = 11 \mid H_1)}{P(u_i = 11 \mid H_0)}.$$

In general, for an n-bit soft decision $u_i$ having value $bit_0$ $bit_1$ . . . $bit_{n-1}$, the combining node 215 may compute the likelihood ratio $Y_i$ as follows:

$$Y_i = \frac{P(u_i = bit_0 bit_1 \ldots bit_{n-1} \mid H_1)}{P(u_i = bit_0 bit_1 \ldots bit_{n-1} \mid H_0)}.$$

FIG. 4b is a diagram illustrating a sequence of events 450 for the generation of unsynchronized cooperative spectrum sensing information by a CR node. Since synchronization with other CR nodes may not be needed in unsynchronized cooperative spectrum sensing, the generation of unsynchronized cooperative spectrum sensing information may occur at any time. However, the CR nodes may be told to generate the unsynchronized cooperative spectrum sensing information periodically, for example. The generation of unsynchronized cooperative spectrum sensing information by a CR node may begin with the CR node enabling a filter, preferably a band-pass filter (block 455). The band-pass filter may be configured to block signals outside of a frequency band while permitting signals within the frequency band pass, with the frequency band encompassing a frequency band of interest. The CR node may then measure the received energy of signals at an output of the filter (block 460). The received energy may be computed from the signals by squaring the signals, for example.

The received energy may be accumulated by an accumulator for a specified measurement interval (block 465). After the measurement interval expires, the CR node may make a decision on the presence of a transmission by comparing the accumulated received energy with a threshold (block 470).

Comparing the accumulated received energy with a single threshold may implement a hard decision. A soft decision may be made by comparing the accumulated received energy with several thresholds or by normalizing the accumulated received energy. The decision may then be transmitted to the combining node 215 (block 475) and the generation of unsynchronized cooperative spectrum sensing information may terminate.

Figure 6:
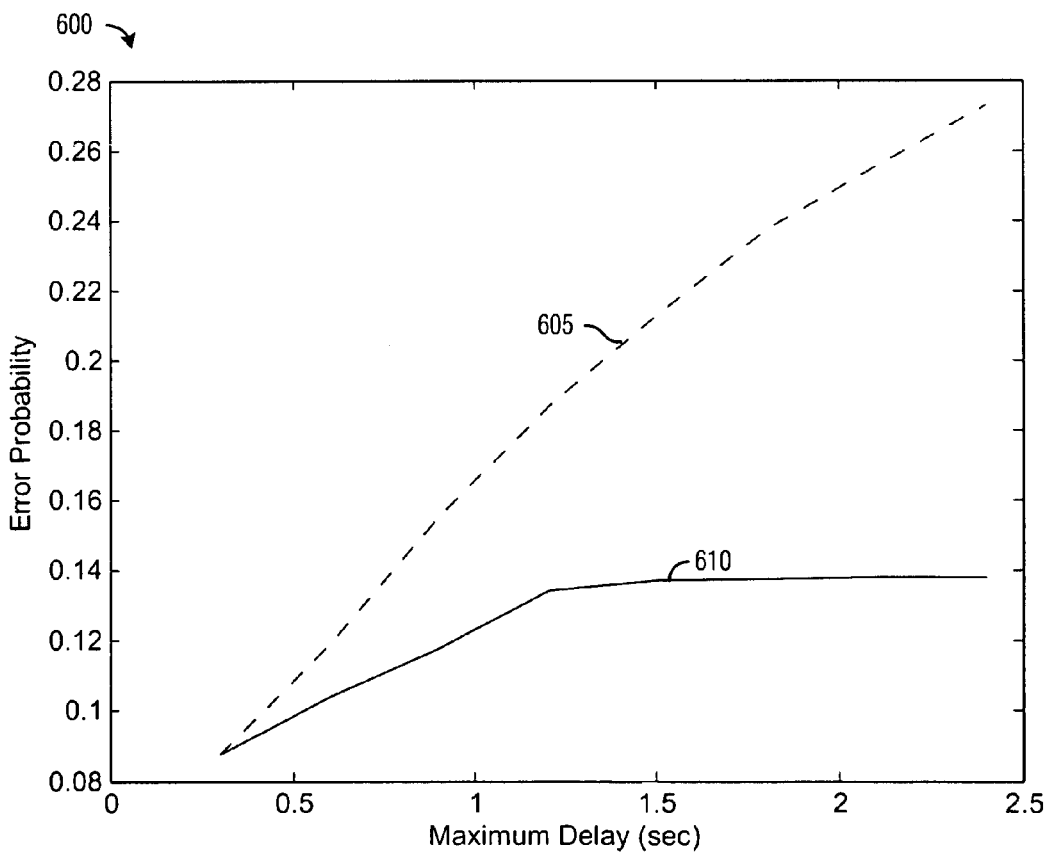
FIG. 6 is a diagram of a data plot of error probability versus maximum delay for synchronized cooperative spectrum sensing and unsynchronized cooperative spectrum sensing.

FIG. 6 is a data plot 600 illustrating error probability versus maximum delay (Tm) in a CR communications network. The data plot 600 was generated using a simulation of synchronized cooperative spectrum sensing and unsynchronized cooperative spectrum sensing with the following network parameters: $P_{D,i}=0.95$, $P_{F,i}=0.1$, $\alpha=0.4$ sec$^{-1}$, and $\beta=0.4$ sec$^{-1}$, with a maximum number of users being equal to 10*Tm and delays between individual spectrum sensings at different CR nodes are evenly distributed within [0 Tm]. The error probability is the false alarm plus mis-detection rate at the combining node 215. A first trace 605 displays the error probability versus maximum delay for synchronized cooperative spectrum sensing and a second trace 610 displays the error probability versus maximum delay for unsynchronized cooperative spectrum sensing.

Unsynchronized cooperative spectrum sensing shows lower error probabilities in comparison with synchronized cooperative spectrum sensing assuming that observations happen at the same time. The difference between unsynchronized cooperative spectrum sensing and synchronized cooperative spectrum sensing may be magnified as the maximum delay between individual spectrum sensings at different CR nodes and final combination is increased.

Although the embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for performing cooperative spectrum sensing for a frequency band, the method comprising:
   receiving spectrum sensing information from a plurality of communications nodes, wherein each communications node determines its respective spectrum sensing information at a time unrelated to times when other communications nodes in the plurality of communications nodes determine their spectrum sensing information;
   computing for each communications node in the plurality of communications nodes, a likelihood ratio based on spectrum sensing information provided by the communications node, the likelihood ratio comprising a ratio computed from a detection probability based on the received information and false alarm probability based on the received information;
   combining the likelihood ratios; and
   computing a decision value based on the combined likelihood ratio.

2. The method of claim 1, further comprising after the computing a decision value, transmitting the decision value to the communications nodes in the plurality of communications nodes.

3. The method of claim 1, wherein the plurality of communications nodes is a subset of all communications nodes in a communications network, further comprising after the computing a decision value, transmitting the decision value to all communications nodes in the communications network.

4. The method of claim 1, wherein the computing for each communications node comprises:
   computing the detection probability based on the received information for a communications node i;
   computing the false alarm probability based on the received information for the communications node i; and
   computing a likelihood ratio $Y_i$, wherein $Y_i$=(detection probability)/(false alarm probability).

5. The method of claim 4, wherein the detection probability is a probability that the communications node i correctly identified a state of the frequency band.

6. The method of claim 4, wherein the false alarm probability is a probability that the communications node i incorrectly determined the state of the frequency band.

7. The method of claim 1, wherein the combining the likelihood ratios comprises multiplying the likelihood ratios.

8. The method of claim 1, wherein the computing a decision comprises generating the decision based on a comparison of the combined likelihood ratio and a threshold.

9. A method for performing unsynchronized cooperative spectrum sensing for a frequency band, the method comprising:
   receiving a decision about a state of the frequency band from each node in a plurality of nodes, wherein each decision is determined at a time unrelated to times when other nodes in the plurality of nodes determine their corresponding decisions;
   computing for each received decision, a likelihood ratio based on the received decision, the likelihood ratio comprising a ratio computed from a detection probability based on the received decision and false alarm probability based on the received decision;
   computing a combined likelihood ratio from the computed likelihood ratios;
   determining a combined decision from the combined likelihood ratio; and
   providing the combined decision to the plurality of nodes.

10. The method of claim 9, wherein $u_i$ is a received decision from node i, and wherein the computing for each received decision comprises:
    computing the detection probability ($P_{D,i}$) based on the received decision ($u_i$);
    computing the false alarm probability ($P_{F,i}$) based on the received decision ($u_i$); and
    computing a likelihood ratio ($Y_i$) from the detection probability ($P_{D,i}$) and the false alarm probability ($P_{F,i}$).

11. The method of claim 10, wherein the received decision ($u_i$) is a hard decision with value either 0 or 1, wherein the frequency band has busy periods with a probability density function expressible as $f_B(t)=\alpha e^{-\alpha t}$ and idle periods with a probability density function expressible as $f_I(t)=\beta e^{-\beta t}$, where α is a transition rate from busy to idle state and β is a transition rate from idle to busy state, and wherein the computing the likelihood ratio ($Y_i$) is expressible as:

$$Y_i = \frac{P(u_i = 1 \mid H_1)}{P(u_i = 1 \mid H_0)} = \frac{P_{D,i} e^{-\alpha(t-t_i)} + P_{F,i}(1 - e^{-\alpha(t-t_i)})}{P_{D,i}(1 - e^{-\beta(t-t_i)}) + P_{F,i} e^{-\beta(t-t_i)}}$$

in response to determining that the received decision ($u_i$) is equal to 1, or $$Y_i = \frac{P(u_i = 0 \mid H_1)}{P(u_i = 0 \mid H_0)} = \frac{(1 - P_{D,i}) e^{-\alpha(t-t_i)} + (1 - P_{F,i})(1 - e^{-\alpha(t-t_i)})}{(1 - P_{D,i})(1 - e^{-\beta(t-t_i)}) + (1 - P_{F,i}) e^{-\beta(t-t_i)}}$$

in response to determining that the received decision ($u_i$) is equal to 0,
where $H_1$ is a hypothesis that the frequency band is busy, and $H_0$ is a hypothesis that the frequency band is idle.

12. The method of claim 11, wherein the received decision ($u_i$) equal to 1 indicates that the frequency band is busy and the received decision ($u_i$) equal to 0 indicates that the frequency band is idle.

13. The method of claim 10, wherein the received decision ($u_i$) is a n-bit soft decision with value $bit_0 bit_1 \ldots bit_{n-1}$, and wherein the computing the likelihood ratio ($Y_i$) is expressible as:

$$Y_i = \frac{P(u_i = bit_0 bit_1 \ldots bit_{n-1} \mid H_1)}{P(u_i = bit_0 bit_1 \ldots bit_{n-1} \mid H_0)},$$

where $H_1$ is a hypothesis that the frequency band is busy, and $H_0$ is a hypothesis that the frequency band is idle.

14. The method of claim 13, wherein the received decision ($u_i$) is a two-bit soft decision with value 00, 01, 10, or 11, and wherein the computing the likelihood ratio ($Y_i$) is expressible as:

$$Y_i = \frac{P(u_i = 00 \mid H_1)}{P(u_i = 00 \mid H_0)}$$

in response to determining that the received decision ($u_i$) is 00, or $$Y_i = \frac{P(u_i = 01 \mid H_1)}{P(u_i = 01 \mid H_0)}$$

in response to determining that the received decision ($u_i$) is 01, or $$Y_i = \frac{P(u_i = 10 \mid H_1)}{P(u_i = 10 \mid H_0)}$$

in response to determining that the received decision ($u_i$) is 10, or $$Y_i = \frac{P(u_i = 11 \mid H_1)}{P(u_i = 11 \mid H_0)}$$

in response to determining that the received decision ($u_i$) is 11.

15. The method of claim 9, wherein the computing a combined likelihood ratio (Y) is expressible as:

$$Y = \prod_{i=1}^{K} Y_i,$$

where $Y_i$ is the likelihood ratio for node i, and K is a number of nodes in the plurality of nodes.

16. An electronic device comprising:
a receiver configured to process signals transmitted over the air;
a transmitter configured to process signals to be transmitted over the air;
a processor coupled to the receiver and to the transmitter, the processor configured to:
compute a likelihood ratio for each decision about a state of a frequency band received by the electronic device, wherein each decision is provided by a communications node out of a plurality of communications nodes and each decision is made at a time independent of times when other communications nodes make their decisions, and wherein the likelihood ratio comprises a ratio computed from a detection probability based on the received decision and false alarm probability based on the received decision, and
compute a combined likelihood ratio from the likelihood ratios, and to make a decision about a state of the frequency band based on the combined likelihood ratio; and
a memory coupled to the processor, the memory to store the received decisions, the computed likelihood ratios, and the combined likelihood ratio.

17. The electronic device of claim 16, wherein the processor comprises:
a ratio compute unit configured to compute, for each received decision, the likelihood ratio based on the received decision;
a ratio combine unit coupled to the ratio compute unit, the ratio combine unit configured to compute the combined likelihood ratio from the likelihood ratios computed by the ratio compute unit; and
a decision unit coupled to the ratio combine unit, the decision unit configured to make the decision about the state of the frequency band based on the combined likelihood ratio.

18. A communications network comprising:
a plurality of nodes, each node configured to make a decision about a state of a frequency band by sensing a spectrum of the frequency band, wherein at each node in the plurality of nodes, the sensing of the spectrum occurs at a time unrelated to times when other nodes in the plurality of nodes sense the spectrum; and
a combining node coupled to the plurality of nodes, the combining node configured to receive from each node in the plurality of nodes the decision about the state of the frequency band, to determine a likelihood ratio computed from a detection probability of the received decision and false alarm probability of the received decision, and to compute a combined decision from the received decisions.

19. The communications network of claim 18, wherein the plurality of nodes is a subset of all nodes in the communications network.

20. The communications network of claim 18, wherein the combining node is further configured to compute the combined decision from historical information regarding network traffic in the communications network and to provide the combined decision to the plurality of nodes.

21. The communications network of claim 18, wherein each node in the plurality of nodes adjusts their respective transmission and reception parameters based on the combined decision.

* * * * *